(12) United States Patent
Smith et al.

(10) Patent No.: US 6,621,916 B1
(45) Date of Patent: Sep. 16, 2003

(54) METHOD AND APPARATUS FOR DETERMINING DOCUMENT AUTHENTICITY

(75) Inventors: James E. Smith, Bruceton Mills, WV (US); Robert P. M. Craven, Morgantown, WV (US); Kenneth E. Vance, Morgantown, WV (US); Curtis Duhn, Rochester, NY (US); Franz A. Pertl, Morgantown, WV (US)

(73) Assignee: West Virginia University, Morgantown, WV (US)

( * ) Notice: Subject to any disclaimer, the term of this patent is extended or adjusted under 35 U.S.C. 154(b) by 0 days.

(21) Appl. No.: 09/389,675

(22) Filed: Sep. 2, 1999

(51) Int. Cl.[7] .................................................. G06K 9/00
(52) U.S. Cl. ........................ 382/112; 389/135; 250/556
(58) Field of Search ................................ 382/112, 135, 382/181; 250/556, 569; 356/71, 446, 448, 402; 340/5.8, 5.86; 194/207

(56) References Cited

U.S. PATENT DOCUMENTS

| | | | |
|---|---|---|---|
| 3,220,549 A | 11/1965 | Wong | |
| 3,480,785 A | 11/1969 | Aufderheide | |
| 3,679,314 A | 7/1972 | Mustert | |
| 4,041,456 A | * 8/1977 | Ott et al. ...................... | 382/135 |
| 4,183,665 A | 1/1980 | Iannadrea et al. | |
| 4,184,081 A | 1/1980 | Bergamini | |
| 4,204,765 A | 5/1980 | Iannadrea et al. | |
| 4,319,137 A | 3/1982 | Nakamura et al. | |
| 4,451,521 A | 5/1984 | Kaule et al. | |
| 4,587,434 A | 5/1986 | Roes et al. | |
| 4,618,257 A | 10/1986 | Bayne et al. | |
| 4,684,929 A | * 8/1987 | Edwards et al. ............. | 340/541 |
| 5,027,415 A | 6/1991 | Hara et al. | |
| 5,039,855 A | * 8/1991 | Kemeny et al. ............. | 250/339 |
| 5,319,437 A | 6/1994 | Van Aken et al. | |
| 5,329,595 A | * 7/1994 | Davies et al. ............... | 382/103 |
| 5,400,138 A | 3/1995 | Peterson et al. | |
| 5,418,855 A | * 5/1995 | Liang et al. .................. | 380/23 |
| 5,467,271 A | * 11/1995 | Abel et al. ................... | 364/420 |
| 5,498,879 A | 3/1996 | De Man | |
| 5,537,486 A | 7/1996 | Stratigos et al. | |
| 5,568,251 A | * 10/1996 | Davies et al. ................. | 356/71 |
| 5,615,280 A | * 3/1997 | Izawa et al. ................. | 382/135 |
| 5,818,052 A | * 10/1998 | Elabd .................... | 250/370.09 |
| 6,087,182 A | * 7/2000 | Jeng et al. .................... | 436/66 |

* cited by examiner

Primary Examiner—Jayanti K. Patel
Assistant Examiner—Abolfazl Tabatabai
(74) Attorney, Agent, or Firm—Bril K. Agarwal; Eckert Seamans Cherin & Mellott, LLC

(57) ABSTRACT

A method and apparatus for verifying the authenticity of a document relative to a previously programmed document are disclosed. The method provides a broadband light source; illuminates a document with the light source; collects reflected light; converts it into a corresponding electrical signal or signals; digitizes the electrical signals; and prepares a spectral signature of the document for further analysis. The spectral signature can also be normalized to account for variations in analyzed documents caused by soiling and fading. The method also provides for comparing a previously programmed and stored spectral signature to the spectral signature of a test document using a matching value to indicate whether the test document is authentic or not. The apparatus provides a device for application of the method for verifying document authenticity.

27 Claims, 4 Drawing Sheets

METHOD AND APPARATUS FOR DETERMINING DOCUMENT AUTHENTICITY

BACKGROUND OF THE INVENTION

1. Field of the Invention

The present invention generally relates to methods and apparatus for analyzing documents. This invention more specifically relates to methods and apparatus for verifying the authenticity of a document by processing and analyzing reflected light which is collected from the document.

2. Background Information

Devices have been known for testing the presence of color in paper securities, for checking bank notes, for validating currency, for optical recognition of patterns on documents, and for generally distinguishing between authentic and counterfeit documents. It has been known to provide such devices in various ways.

U.S. Pat. No. 4,183,665 provides a device for determining whether a document has color in it. Filters for this device are chosen to detect if a specific color is present on the document in question. Verification of authenticity for this device requires the personal judgment of the user as to which colors are present on the document.

U.S. Pat. No. 5,537,486 teaches a device which is stated to be a high-speed document verification system. It is primarily designed to detect fine patterns which may not be reproduced by copying equipment.

U.S. Pat. No. 4,204,765 teaches an apparatus for testing colored securities. This device uses different colored diodes for illumination to determine if color is present in a tested document.

U.S. Pat. No. 4,184,081 teaches a method for checking banknotes and apparatus therefor. This patent provides an instrument for measuring color which initiates its analysis on the premise that the color of the copy will not appear exactly the same as the color of the original.

U.S. Pat. No. 4,319,137 teaches an apparatus for identifying sheet like printed matters. The device of this patent is directed to black an recognition.

U.S. Pat. No. 4,587,434 is provided as a currency note validator. This device utilizes a narrow band LED illumination to measure responses of a currency note to a specific portion of the spectrum.

U.S. Pat. No. 3,679,314 teaches an apparatus for optically testing the genuineness of banknotes and other tokens of value. This device uses several narrow band light sources and receives and analyzes the light that is transmitted through the document.

U.S. Pat. No. 3,220,540 teaches a method and apparatus for discriminating between "desired" and "undesired" documents. This device uses several narrow band light sources and takes measurements on several areas of a target document.

U.S. Pat. No. 3,480,785 provides a method and apparatus for validating documents by spectral analysis of light reflected therefrom. This device employs a comparison of measured values in relationship to each other for validation.

U.S. Pat. No. 5,027,415 is provided as a bill discriminating device which uses two narrow band detectors and a ratio comparison of values measured in testing to verify the authenticity of documents tested.

U.S. Pat. No. 4,618,257 is a color sensitive currency verifier which uses two sensors augmented with filters to analyze narrow band width spectral readings on a target. Validation of authenticity occurs by a comparison of the difference between the two measurements.

U.S. Pat. No. 5,498,879 teaches an apparatus for optical recognition of documents by photoelectric elements having vision angles with different length and width. This device uses several narrow band sensors over a linear strip of the document to measure different reflective values of the light in those particular areas.

U.S. Pat. No. 4,204,765 discloses an apparatus for testing color securities. This device uses narrow band light sources to provide reflective light.

Humans are considered to have a tristimulus system, which means that they have three types of color sensors which are sensitive to different weighted portions of the visible spectrum. However, the exact mechanism for color vision is not completely understood due to the difficulty of analyzing the effects of the neural network of the brain as the these effects relate to the retina-brain connection. In lieu of the exact mechanism of color perception, a set of weighting functions was derived from a color matching experiment and adopted as a standard observer by Commission Internationale de l'Eclairage (CIE). Three spectral weighting functions in particular comprise the tristimulus CIE standard observer, which can be employed as a model of human color perception.

A person is generally unaware of these three individual responses to a color object, and instead senses a composite effect of the three stimuli. This behavior of human color perception permits different spectral distributions to appear identical to a human observer. For example, a broad spectrum of light reflected from an object may be interpreted by a human visual system to be white, but the proper blend of red, blue, and green colors will also appear white to the human observer. These two spectrums have different spectral compositions, but they both may be perceived by a human observer to have identical color appearances. Unfortunately, this error in judgment is a boon to those who illegally profit from the reproduction of certain documents such as currency.

Conventional production techniques can produce a first document which has colors which appear to a human observer to be the same as the colors in a second, similar document. However, if the same coloring process was not employed to produce these documents, then the documents are susceptible to differentiation. To a human observer, though, the colors of the first document can appear identical to the colors of the second document. Employing broadband spectral analysis can demonstrate the differences in the colors of these documents.

Conventional use of spectral analysis has been limited to devices which utilize relatively narrow color bands to differentiate between authentic documents and their counterpart reproductions. As a result, an apparatus and method are needed which can be applied for broadband spectral analysis on a wide variety of documents.

What is needed then is a document authentication method and apparatus which use a light source to obtain a broad spectrum of reflected light from a document. A more effective and thorough normalizing of the light analyzed is also needed to verify the authenticity of a variety of documents. In addition, a consistently accurate method and apparatus for comparing the spectral signature generated by a test document to a previously programmed target document is needed.

SUMMARY OF THE INVENTION

The method and apparatus for verifying authenticity of a document of the present invention have satisfied the above-mentioned needs as well as others.

The method of the present invention provides the initial step of providing a broadband light source and illuminating a portion of a document to be verified with the broadband light source. This generates reflected light from the document. The method then provides for collecting and analyzing the reflected light by converting it into a corresponding electrical signal or signals. Next, the electrical signal or signals are digitized to form an array. The method can then include normalizing this array to develop and store a spectral signature associated with the document. The method of the present invention then provides for comparing a test document spectral signature to the spectral signature of a previously stored document. This comparison of the test document spectral signature to the previously stored spectral signature can be accomplished by using a matching function to determine authenticity.

The apparatus of the present invention may include an enclosure having a transparent opening disposed therein. A broadband light source is provided to illuminate a portion of a document placed on the transparent opening. The apparatus may employ a collection lens and optical fiber to receive and transfer light received from the illuminated document. This reflected light is then transferred to an aperture which is located at the focal point of a collimating lens. The collimating lens functions in conjunction with a diffraction grating, or another suitable spectral spreading device, to provide a spectrum of light wavelengths to a photosensor device. A microcontroller or conventional microprocessor and additional components can then be employed in conjunction with the apparatus to perform storage and authenticity determination functions for tested documents. In another aspect of the present invention, several steps of the process may be condensed into the functionality of a single optical component.

Accordingly, it is an object of the present invention to provide a document analysis method and apparatus which utilize a broader range of wavelengths to provide a more thorough analysis in determining document authenticity.

It is a further object of the present invention to provide an apparatus which may be produced at an economical cost.

It is a still further object of the present invention to provide a document analysis method and apparatus which reduce the inherent variation introduced into the analysis by soiled or faded documents which are tested.

These and other objects of the invention will be more fully understood from the following description on reference to the illustrations appended hereto.

DETAILED DESCRIPTION OF THE INVENTION

As used herein, the term "document" is defined in its ordinary sense and includes documents such as, but not limited to, currency, paper checks, bank checks, bank drafts, lottery tickets, coupons, event tickets, stock certificates, bonds, bearer instruments and similar documents which provide some benefit to the holder or are otherwise worth counterfeiting.

In the context of the present invention, the term "authenticity" means that a document is consistent with some target value or within a range including some target value.

The term "broadband" as used herein refers to light wavelengths within the visible range of light as well as those in the infrared and ultraviolet portions of the spectrum.

The terms "array" and "spectral signature" are used herein interchangeably to define a set of data corresponding to a document or a set of documents. In particular, a broadband spectrum of reflected light from a document, or an area of a document, for example, can be referred to as a "spectral signature" for the document.

Figure 1:
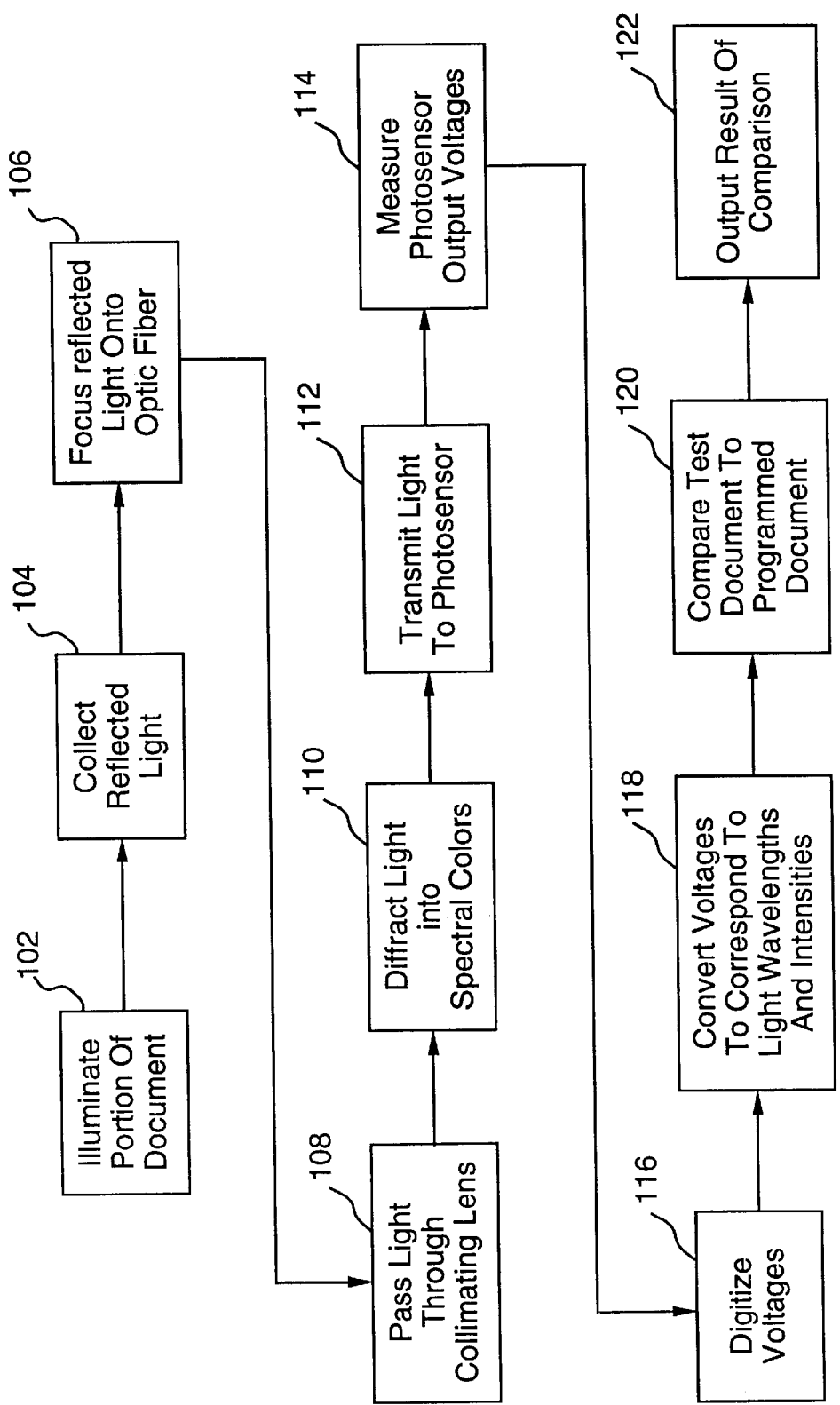
FIG. 1 is a process flow diagram of the preferred method of the present invention.

Referring now to the process flow diagram of FIG. 1, an embodiment of the method of the present invention is provided. After a document is provided, the method begins by providing a broadband light source which is preferably embodied as a broadband tungsten halogen lamp. A conventional tungsten halogen lamp provides light with wavelengths in the approximate range from 320 nm to 750 nm. The lamp can be conventionally regulated to provide a relatively consistent illumination level by removing high frequency light intensity fluctuations. In step 102, at least a portion of the document is presented for illumination by the broadband light source which produces reflected light from the document. In step 104, the method includes collecting the reflected light such as by use of an optical fiber with a collection lens.

In one embodiment, the reflected light is focused onto an optical fiber in step 106 and then is transmitted to an optic module where it exits the fiber through a pinhole or aperture provided in the end of the optical fiber. The pinhole is located in the proximity of the focal point of a collimating lens, which cooperates with a diffraction grating to form a Littrow spectrograph. The lens of this method collimates the polychromatic reflected light exiting the pinhole in step 108. The light is then diffracted into its spectral colors by using a device such as the diffraction grating in step 110.

Referring again to FIG. 1, the now diffracted, polychromatic reflected light is then passed back through the colliminating lens, which now acts as a focusing lens to focus the reflected wavelengths of light. Then, in step 112, this focused light is transmitted to a photosensor such as a CCD photosensor chip by the collimating lens. The sensor chip contains a linear photodiode array that is arranged such that each photodiode captures a portion of the wavelengths in the spectral composition of the reflected light. The exposure or integration period of the sensor chip can be controlled with a microcontroller and it may be varied from document sample to sample to allow for varied ranges of brightness in the documents measured. The method also includes converting the reflected light into an electrical signal or signals of that light.

Once the integration period expires, the microcontroller obtains the signal of each photodiode in step 114. During this process, each signal is clocked out of the photodiode sensor chip in step 114, passed through an operational amplifier circuit for scaling, and then digitized such as with an analog to digital converter in step 116. The method next provides for converting the digitized voltages of the reflected light into an array in step 118. Once inside the microcontroller's memory, the array may be normalized and compared to a previously stored target array in step 120 with a matching function that produces a matching value, preferably embodied as a hit quality index or HQI value. An array which is obtained or stored may be considered to be a spectral signature for a tested document.

Referring again to FIG. 1, step 120 of the method also involves comparing the spectral signature to a previously stored target value to determine if the spectral signature is within acceptable limits of authenticity. If its value is within these acceptable limits, which may be obtained during field programming of an authentic document, the sample is classified as authentic and the method may then output the result of the comparison in step 122. This output may be embodied by the microcontroller indicating authenticity such as by turning on a green light emitting diode. Conversely, if the test document is not within acceptable limits, then a red light emitting diode, for example, may be activated as notification to the user of document inauthenticity. Although, in the scope of the present invention, output of results can also include visual or audible notification to a user and can provide storage of information on digital or magnetic media. The transmission of data may occur with or without visual enhancement, such as by display of the data in a graphical format on an electronic monitor.

In the method of the present invention, the documents to be measured may be of varying brightness levels from general wear, washing, soiling or fading. Subtle variations in light intensity tend to influence the magnitude of the sampled spectral data and affect the comparison functions. The method of the present invention minimizes the effect of these variations in intensity. To account for these variations, mathematical operations are applied to the array of the spectral signature to normalize the array for absolute magnitude before the authentication process is completed. This normalized array may be considered a spectral signature for that document. In production, care must be exercised to utilize spectrally consistent colorants during the document manufacturing process to ensure consistent color signatures in the documents.

A mathematical matching function, which can be designated a Hit Quality Index (HQI), is used to compare a sampled array to a target or stored array. The HQI function is a formula which has a limit approaching zero in proportion to the degree of correspondence between a sampled curve and a target curve. In the method of the present invention, a HQI function is a measurement of authenticity or "fitness" of a spectral signature with respect to a trained, previously programmed, target spectral signature. Comparison between these measured HQI results for a document to be analyzed and a previously measured spectral signature permits authentication. The method measures differences between a sample set of data and a target set of data and judges document authenticity based on a set of upper and lower limits derived from the standard deviation of the training set used to develop a given target spectral signature.

In the preferred embodiment, statistical analysis of a plurality of original documents and a plurality of facsimile documents can permit suitable matching indicators such as the HQI to be determined. Mathematical algorithms for those indicators can then be developed for use by an apparatus employing this method in determining authenticity of a document in question. For example, it will be appreciated that an HQI may be provided as a weighted function to account for areas of the spectrum which are deemed more experimentally important than other areas for purposes of document authentication.

In operation, the method of the present invention procures a spectral signature by sampling spectral data obtained from illuminating a portion of a document. The spectral data from the photosensor, which may be a photodiode sensor chip, is digitized. It may result in an array of n bytes, or preferably 128 bytes, with values ranging from 0 through 127. These array elements are zero indexed such that if R represents the array, $R_0$ contains the spectral response from the highest frequency, preferably in the range of about 800 nm, focused onto the sensor chip, and $R_{127}$ contains the spectral response from the lowest frequency, preferably in the range of about 300 nm, focused on the chip. It will be appreciated that the spectral range and the number of array elements may be changed without departing from the teaching and scope of the present invention.

It will be appreciated that the scope of the present invention includes other areas of the spectrum. For example, a silicon detector operates from about 200 to 1,000 nm; GaAs detectors operate from about 700 nm to 3,000 nm; and, pyroelectric detectors operate from about 1,000 nm to 15,000 nm. It can therefore be understood that various optical components can be selected in the present invention to accommodate different frequency ranges.

Once the spectral data is obtained, the method optionally employs a step for discarding the user-determined "noisy" parts of the spectrum to prevent excessive signature variation and to provide a "clipped" or truncated signature. Elements of a CCD photosensor array, for example, that are exposed to relatively low levels of light tend to acquire a relatively random and noisy signal. To resist this "dark" noise from causing excessive variation in the spectral signatures, the preferred method of the present invention discards spectral data that are less than a certain value as follows:

$$C_i = \max(R_i - f, 0) \quad \text{(Eq. 1)}$$

where C is the resulting clipped signature and where $i \in [0, 1, \ldots 127]$ is the element of the sensor chip, R is the spectral data sampled from the sensor chip, and f is the spectral noise floor value which may be predetermined and selected by a user. This noise floor value is user selected in the method to allow for a wide array of varying samples to be examined.

The next step employed to convert the spectral data into a spectral signature is normalizing the data. Subtle variations in light intensity or luminance tend to influence the magnitude of the sampled spectral data. These variations in luminance can be attributed to physical wear and tear experienced over the lifetime of the document or documents, such as from soiling, washing, or general fading. It is an object of the present invention to minimize the effect of these fluctuations in intensity, while preserving the integrity of the spectral signature. To accomplish normalizing the spectral signature, the array of spectral signature data may be normalized as follows:

$$N_i = \frac{nC_i}{\sum_{j=0}^{127} C_j} \quad \text{(Eq. 2)}$$

where n is the integer number of array elements, where N is the resulting normalized spectral signature, where $i \in [0, 1, \ldots, 127]$, and where C is the clipped signature resulting from a previous step in the method.

To authenticate a spectral signature, the method of the present invention obtains and stores target special signatures against which sampled spectral signatures are compared. The method also provides acceptable tolerance limits, obtained from document testing, within which a sampled spectral signature may vary and still be considered authentic when compared to its corresponding target signature. To create a target or authentic spectral signature the method may analyze signatures of several known valid documents of the quality of the documents to be sampled and average those signatures into a composite spectral signature for the document type:

$$T_i = \frac{\sum_{j=1}^{n} S_{ij}}{n} \quad \text{(Eq. 3)}$$

where $i \in [0, 1, \ldots, 127]$, $S_{ij}$ is element i of training signature j, n is the number of signatures in the training set, and T is the resulting target signature. It will be appreciated that the "N" and "S" values described in the preceding two equations are interchangeable in their application to the present invention.

The training set is a representative sample of documents likely to be encountered in commercial application of the method of the present invention. The standard deviation of the training set is used to determine the acceptance deviation or acceptable tolerance limits in the samples being tested. To qualify the variation in the training set, the standard deviation of each signature element across the training set is computed, and the result summated:

$$HQISD = \sum_{i=0}^{127} \sqrt{\frac{\sum_{j=1}^{n}(S_{ij}^2)}{n} - \left(\sum_{j=1}^{n} S_{ij}\right)^2} \quad \text{(Eq. 4)}$$

where $S_{ij}$ is element i of training signature j, and n is the number of signatures in the training set. This value is called the HQISD since it is mathematically equivalent to the standard deviation of the HQI's of the training set signatures.

When a signature is to be tested, the HQISD for the document type is multiplied by a tolerance limit factor to determine the greatest HQI that a sample array can have and still be considered valid. The user may set this multiplier depending on the tolerances of the production process and the degree to which the sample set represents documents likely to be encountered in the commercial application of the device. If the target signature's HQI value is less than the product of this multiplier and the HQISD, then the sample is considered authentic.

Thus, a function called a hit quality index (HQI) may be used to compare a spectral signature to a target signature. An HQI is a measurement of "fitness" of a spectral signature with respect to a trained target signature. The calculation for the HQI implemented in this embodiment involves a subtraction of the respective array elements of the sampled signature from the target signature to obtain difference vector elements, and summation of the absolute values of the resulting difference vector elements. Therefore, if T is the target signature, and S is the sample being tested, then $$HQI = \sum_{i=0}^{127} |T_i - S_i| \quad \text{(Eq. 5)}$$

As discussed previously, if specific areas of the sampled spectrum are deemed more experimentally important than others, then a weighted summation could be employed for calculating the HQI value. For example, the "weighting function" can be an array of values multiplied by the spectral signature array, such that, $$HQI = \sum_{i=0}^{127} W_i |T_i - S_i| \quad \text{(Eq. 6)}$$

where $W_i$ is a weighting vector with numbers less than one corresponding with numbers in a sampled array which are deemed less relevant and numbers greater than one corresponding to numbers in a sampled array which are deemed more relevant. For example, a portion of a sample weighting function can be expressed as follows:

$$W_i = \{0.5, 0.5, 1, 1, 0.5, 0.5, 1.2, 1.2 \ldots\}$$

It can be understood that use of a weighting function will be driven by factors such as the type of light source employed and the quality of documents which are tested.

Figure 2:
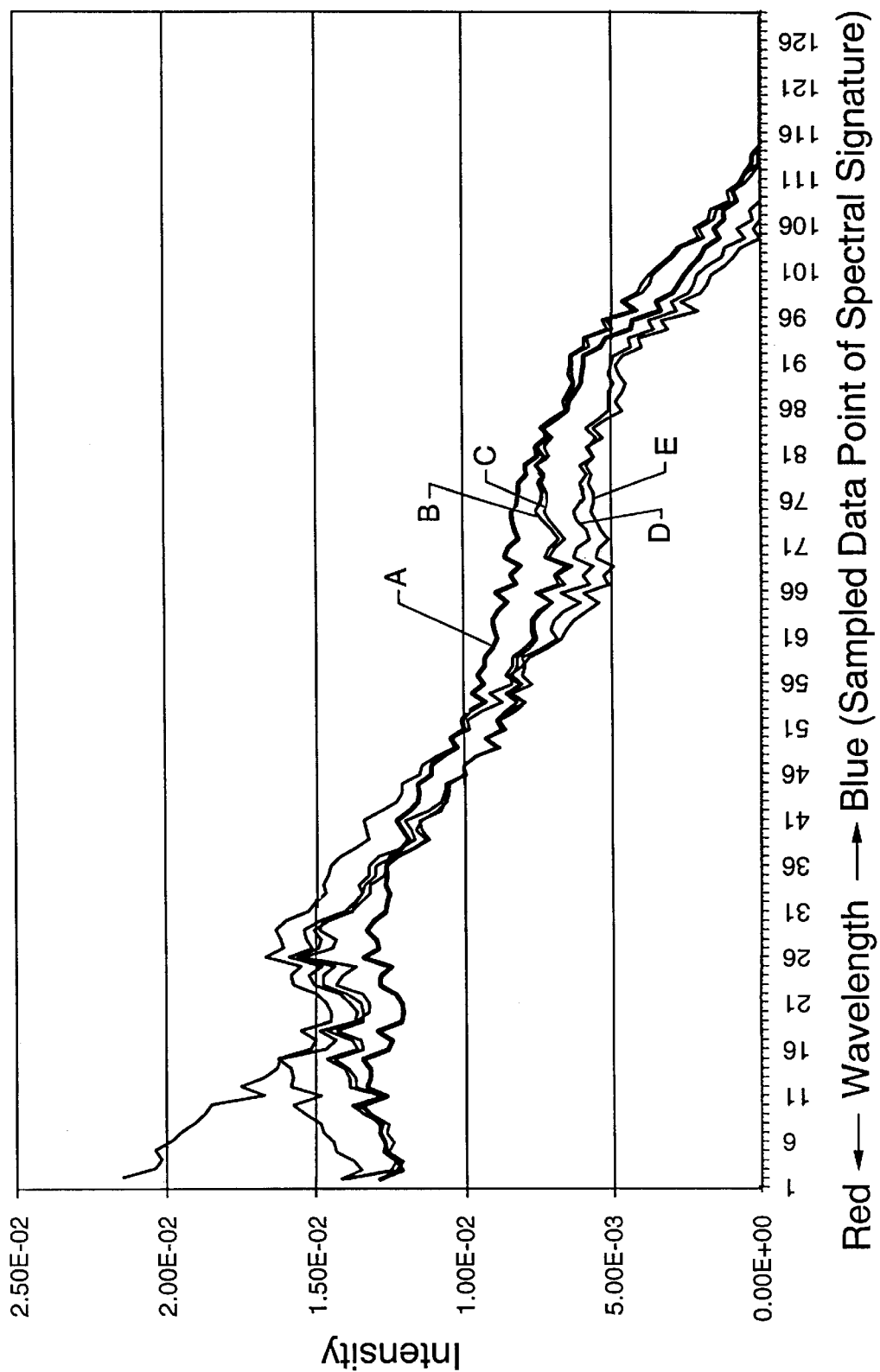
FIG. 2 is a graph of an embodiment of authentication output for the present invention.
Figure 3:
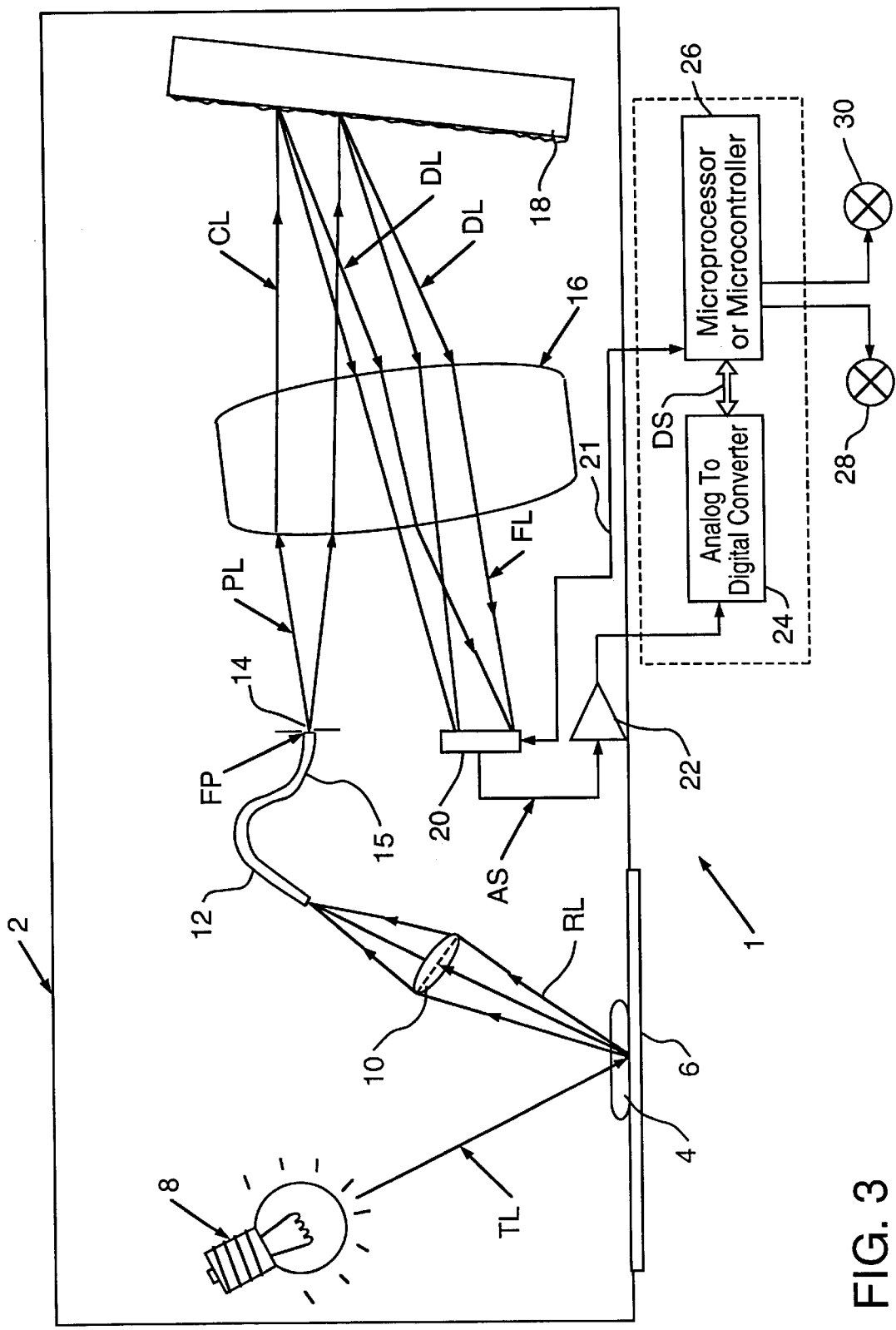
FIG. 3 is a schematic view of a typical embodiment of the apparatus of the present invention; and, FIG. 4 is a partially schematic top isometric view of an embodiment of the apparatus of the present invention with its cover removed.
Figure 4:
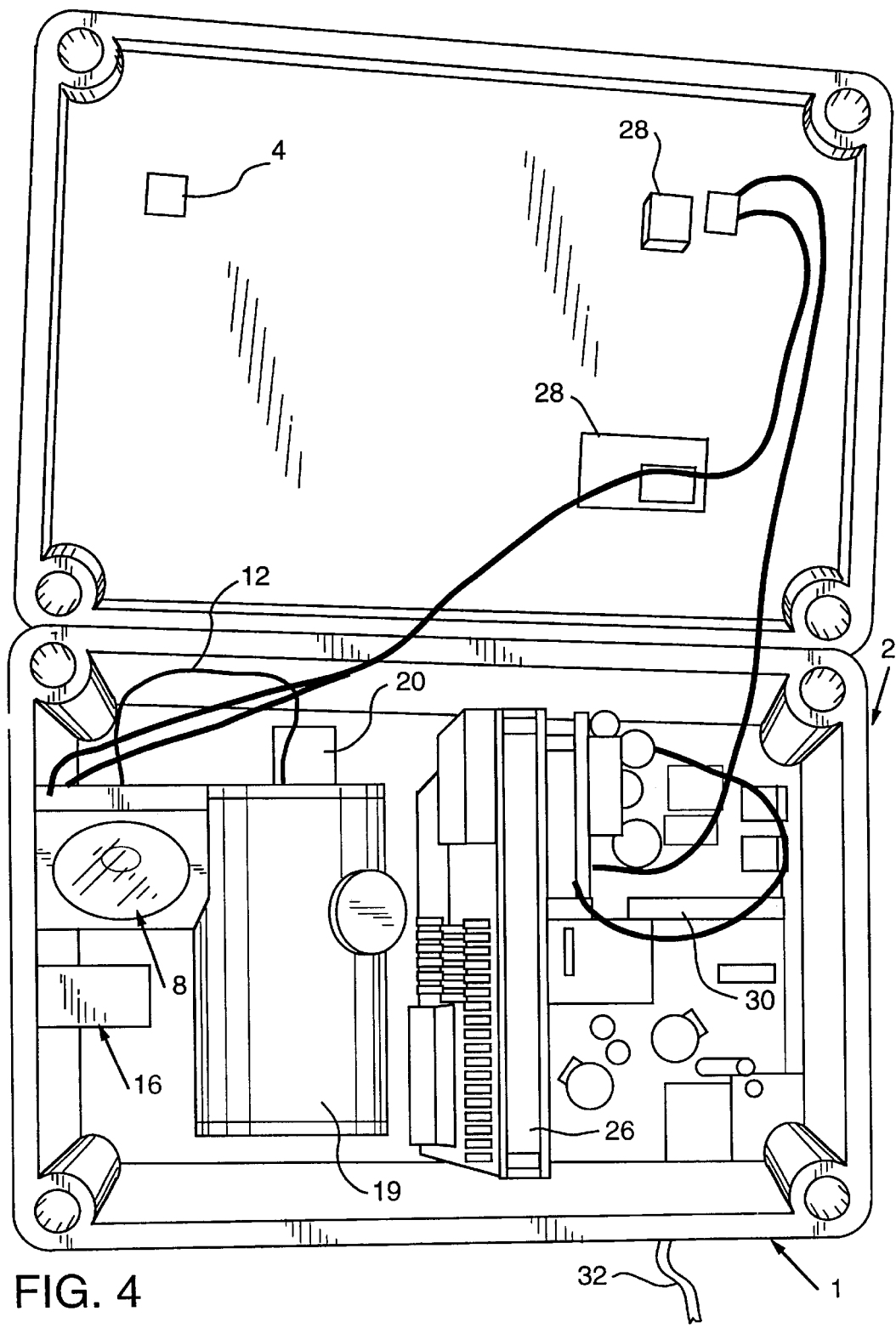

With reference to FIGS. 2 through 4, the following examples are intended to illustrate several embodiments and uses of the present invention. These examples are not intended to limit the scope of the present invention.

TABLE I

Tabulation of Analysis of FIG. 2

| Acceptable # of HQISD's (Acceptance Threshold): | | 3.00 |
| Target Signature HQISD: | | 0.00585046 |
| Acceptable Limit: | | 0.01755139 |

| Curve | HQI | # of HQISD's | Output |
| --- | --- | --- | --- |
| A | 0.00715536 | 1.22 | Authentic |
| B | 0.09706872 | 16.59 | Inauthentic |
| C | 0.10568740 | 18.06 | Inauthentic |
| D | 0.21941390 | 37.50 | Inauthentic |
| E | 0.1899286 | 32.46 | Inauthentic |

As an illustrative example, referring now to FIG. 2 depicted herein, a series of spectral signature curves A, B, C, D and E can be graphically represented to demonstrate analysis of a document sample to determine its authenticity. These spectral signatures are plotted as Intensity values (unitless) versus each data point obtained from a tested document (0–127) for the purposes of this example). As shown in FIG. 2, the Target Curve A is the spectral signature curve representation of a previously stored target signature generated by the method of the present invention. It will be understood that the Intensity values To be considered authentic, the graphical representation of a tested document must sufficiently map to the Target Curve A. By contrast, the curves B, C, D and E are not authentic and do not sufficiently map to the Target Curve A to be considered authentic.

Referring again to Table I in conjunction with FIG. 2, an example of a tabular representation of the document analysis is presented. In this example, the method of the present invention provides for establishing an HQISD value for the target spectral signature of 0.00585046, which is calculated during the programming and storage of the target spectral signature. A threshold value of 3.00 is multiplied by the target signature HQISD to provide a range having an upper limit which provides the acceptable number of standard deviations within which a tested or sampled spectral signature HQI value may fall for a determination of document authenticity. In this example, the acceptable limit is calculated to be 0.01755139. Therefore, only "Authentic" test data which has an HQI of 0.00715536 falls within the range of the required 3 HQISD's established for acceptance by the Target Curve A spectral signature.

In another embodiment of the present invention, an apparatus for verifying the authenticity of a document is provided. It will be appreciated that the apparatus described herein is illustrative of a typical embodiment of the method of the present invention and that certain conventional components of the apparatus may be exchanged with other suitable components.

Referring now to FIGS. 3 and 4, the apparatus 1 of the present invention is shown with an enclosure 2 having a window 4 or other conventional transparent opening formed therein. The enclosure 2 is provided as a generally box-shaped metal enclosure which is suitable for containing the components of the apparatus 1 of the present invention. At least a portion of a document 6 is placed over the window 4 to permit a broadband light source 8, which can be provided as a tungsten halogen lamp, for example, to illuminate the portion of the document 6 placed on the window 4. It will be understood that the percentage surface will be subject to the discretion of the user. The amount of the document illuminated will depend on factors such as the type of document analyzed and the portion of the document surface required to present a representative and valid sample for testing. The document 6 can be conventionally indexed in conjunction with the apparatus 1 to position the desired portion of the document 6 to be analyzed over the window 4.

The light source 8 transmits light wavelengths TL to the document 6. A collection lens 10 and an optical fiber 12 are provided to collect and transmit reflected light RL emanating from the document 6. An aperture or pinhole 14 is positioned at an end 15 of the optical fiber 12 and is also adjacent to the focal point FP of a collimating lens 16. The collimating lens 16 receives light PL from the pinhole 14 and then collimates the light PL into collimated light CL. The collimated light CL is then converted into diffracted light DL by a diffraction grating 18 or another suitable diffraction device. It will be appreciated that a conventional refraction technique could also be employed in lieu of this diffraction grating 18. It will also be appreciated that optical components of the present invention can be combined into an optic module 19 as shown in FIG. 4.

The collimating lens 16 now acts as a focusing lens to focus the diffracted light DL into focused light FL and transfer the focused light FL to a sensor chip 20, which may be embodied as a CCD photosensor chip. The focused light FL can be separately grouped into longer wavelength light and shorter wavelength light as it impinges on the sensor chip 20. The focused light wavelengths FL are converted to an electrical signal or signals, which can be voltages, and stored by the sensor chip 20. The signals stored on the sensor chip 20 therefore represent different wavelengths of the focused light. The signals are then clocked out of the sensor chip 20 and processed as analog signals AS. The signals are clocked out of the sensor chip by an operative connection 21 with a conventional microprocessor 26 or other suitable microcontroller. The microcontroller 26 is also operatively associated with the sensor chip 20 to permit adjustment of the exposure time for the focused light FL impinging on the sensor chip 20.

The analog signals AS are then conditioned for further analysis such as by processing the signals AS through an amplifier 22. The output of the amplifier 22 feeds the signals AS into a conventional analog-to-digital converter 24 to generate digital signals DS which correspond to the analog signals AS. A microcontroller 26 or other suitable, conventional microprocessor is employed in conjunction with the apparatus 1 to receive and process the digital signals DS.

The digital signals DS are then processed by the microcontroller 26 consistent with the method of the present invention previously discussed. It will be appreciated that since the software employed in the preferred practice of the present invention may be readily programmed and used by one skilled in the art, a detailed description of this software is deemed unnecessary.

In addition, a conventional switching system 28 is employed to change the various functions of the apparatus of the present invention. The apparatus 1 is powered by a conventional power supply 30 coupled to a power cord 32.

Optionally, a user may be notified of the authenticity or other information about the digital signals DS by a pair of lights 28,30. For example, the light 28 may be a red light which indicates an inauthentic document has been tested and detected. In addition, the light 30 may be a green light which notifies the user that an authentic document has been presented to the apparatus 1 for testing.

The following examples are intended to represent particular aspects of the operation of the method and apparatus of the present invention. It will be appreciated that these examples are not intended to limit the scope of the invention, but rather teach a use of the method and apparatus to one skilled in the art.

EXAMPLE 1—OPERATION

Normal operation of a device employing the method of the present invention, which is known as a "DFS" device or a "Document For Sure" device, does not require the device to be connected to a personal computer or other microprocessing apparatus. The DFS device can undergo new programming and verification duties as a standalone unit. The situation may arise, however, where the user desires to change the operating parameters of the device or receive extended information regarding the spectral signatures being sampled and stored. To address these needs, the method and apparatus of the present invention can provide a serial communication protocol and interface by which a computer or other conventional microcontroller may communicate with and control the DFS device.

A user may issue commands to the DFS device using a suitable, conventional device that supports standard asynchronous serial communication, i.e., a standard computer serial port. All commands sent to the DFS device can be in lower case ASCII, and are separated from their parameters by one or more spaces. A listing of commands which are used to communicate with the microcontroller can be seen in Table II (below):

TABLE II

Microcontroller Commands

| Command | Parameter | Description |
| --- | --- | --- |
| serialon | (none) | Tells the DFS device to report spectral signatures as they are acquired. |
| serialoff | (none) | Tells the DFS device not to report spectral signatures as they are acquired. |
| setfloor | Noise floor | Sets the noise floor value for testing samples. Value from 0–255. Default of 50. |
| getfloor | (none) | Displays the current noise floor value. |
| setthresh | Threshold | Sets the acceptance threshold in number of standard deviations for test samples. Value of 0 or higher. Default of 3. |
| getthresh | (none) | Displays the current acceptance threshold. |

TABLE II-continued

Microcontroller Commands

| Command | Parameter | Description |
|---|---|---|
| settarget | (none) | Sets the current target spectral signature and the HQISD of the signature. |
| gettarget | (none) | Gets the current target spectral signature and the HQISD of the signature. |
| sample | (none) | Acquires a spectral signature or array. (May be a: "sample" button.) |

The DFS device can be instructed to transmit the spectral signatures to the user as the signatures are sampled. This permits the user to create graphs of the spectral signatures as acquired. This feature can be enabled by sending the "serialon" command. Once it is enabled, the DFS device sends each sampled spectral signature over the serial port until the DFS device is reset or the "serialoff" command is issued. This feature can be disabled by default when the DFS device is reset so that the DFS device can operate without being attached to a computer.

There are two operating parameters that can be changed using the serial protocol: the noise floor value which is changed using the "setfloor" command, and the acceptance threshold which is set using the "setthresh" command. The noise floor value is the intensity value below which the noise level is still be considered too great for a portion of the photosensor to contain useful information. The acceptance threshold is the number of standard deviations of the HQI of the target spectral signature by which tested spectral signature samples can differ from their stored spectral signature counterparts and still be considered valid.

The user can also query the DFS device for several different types of information. The "getthresh" and "getfloor" commands return the respective operating parameters which they represent as set by the user as shown in Table II. In addition, the "gettarget" command returns the target spectral signature against which samples are being compared, and the standard deviation of the HQI's used in subsequent calculations for comparison. The "settarget" command permits previously trained spectral signatures which may have been developed and stored on a device such as a computer to be received by the DFS device.

The "sample" command may be sent instead of pressing, for example, a "sample" button on the apparatus of the present invention. The user may also automate sample acquisition to create continuous spectral signature graphs, for example, of the individual sampled document spectral signatures. The function of the "sample" command may be dependent on the position of a "verification/training" switch which can be employed as part of the apparatus of the present invention.

The DFS device includes two modes of operation: training and verification. In training mode, the user programs the DFS device to recognize and store a target spectral signature by presenting multiple samples to the device. In verification mode, the user can test a sample document against the spectral signature for the corresponding document type for which the DFS device has been trained.

EXAMPLE 2—TRAINING MODE

Before the DFS device can test and establish a spectral signature for a specific sample, it is first programmed to recognize the spectral signature of that sample. With respect to the method and apparatus of the present invention, the training or programming process includes several steps. First, the user switches the DFS device into training mode. Next, the user positions a programming sample over the window of the device, presses the sample button and waits to view a green light. The positioning, pressing the sample button, and viewing the green light steps are then repeated for analysis of additional samples to be programmed. When all desired documents have been sampled, the user can switch the DFS device to verification mode. Finally, the user presses the sample button to finalize programming and to make the programmed signature available for testing purposes.

The DFS device then analyzes a sample in verification mode at the end of the programming process; this first sample in verification mode directs the DFS device to finalize programming. The verification mode is discussed hereinafter in further detail. It is also at this time that the mean and standard deviation of the training set spectral signatures are calculated.

It will be appreciated that a sampled spectral signature must consist of at least two measurements, preferably more than two, for training and storage purposes. It will also be appreciated that if a different HQI function is employed, then this measurement plurality requirement may not be necessary. This is because verification, or the determination of document authenticity in the preferred embodiment of the present invention, is a function of the standard deviation of the spectral signatures which are part of the comparison process. If the spectral signature consists of only one measurement, the standard deviation will be zero which will preclude any subsequently tested document from being accurately determined as authentic or inauthentic. A preferred spectral signature consists of several documents of the same kind and degree of variation as the documents that are to be tested and analyzed.

EXAMPLE 3—VERIFICATION MODE

Once the DFS device has been programmed, it can be used to check the spectral signature of a test document against its stored target spectral signature counterpart. The verification process involves the first step of switching the DFS device into verification mode. Next, the user positions the sample document to be verified over an opening such as a window of the device. Finally, the user presses a "sample" button, for example, and can expect output of the inauthenticity or authenticity of the document in the form of a visual display such as a red or green light, for example, or the output can be stored to magnetic or digital media.

For visual notification of the output, a red light can indicate that the sampled spectral signature lies outside the specified acceptable limits or tolerance and a green light can indicate that the signature lies within the acceptable limits. The acceptable limits are expressed as a function of the standard deviations of the individual programmed target spectral signature when employing the preferred HQI function to determine document authenticity. As previously discussed, the acceptable limits may be programmed using a serial communication protocol.

It will therefore be appreciated that the present invention provides a document analysis which utilizes a broad band of wavelengths to provide a more thorough and more reliable determination of document authenticity. The present invention also provides an apparatus for analyzing documents which can be produced at an economical cost. The document analysis method and apparatus disclosed herein also advantageously reduce the inherent variation introduced into the analysis by soiled or faded documents which are tested.

While specific embodiments of the invention have been disclosed, it will be appreciated by those skilled in the art that various modifications and alterations to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A method for determining the authenticity of a document comprising:
    providing a broadband light source;
    illuminating at least a portion of said document with said broadband light source to produce a broadband spectrum of reflected light from said document;
    collecting said broadband spectrum of reflected light;
    converting said broadband spectrum of reflected light into at least one electrical signal corresponding to said broadband spectrum of reflected light;
    generating an intensity value for each of a plurality of different wavelengths of light in the broadband spectrum of reflected light;
    digitizing said electrical signals of said broadband spectrum of reflected light;
    producing a spectral signature that includes an array of the intensity values; and
    comparing said array of intensity values of said spectral signature with an array of reference intensity values of a reference spectral signature to determine an authenticity for said document.

2. The method of claim 1, further comprising generating the reference spectral signature by generating an intensity value for each of a plurality of different wavelengths of light reflected from each of a plurality of reference documents of known authenticity and mathematically combining the intensity values for each of the plurality of different wavelengths of light reflected from the reference documents to determine the reference intensity value for each of the plurality of different wavelengths.

3. The method of claim 1, further including the step of outputting said authenticity determination.

4. The method of claim 1, wherein said comparing step comprises using a matching function to compare said spectral signatures.

5. The method of claim 1, further comprising the steps of collecting said reflected light with an optical fiber, collimating said reflected light, diffracting said reflected light, and focusing said reflected light on a means for sensing light.

6. The method of claim 5, wherein said focusing step comprises using a means for sensing light having a CCD photosensor array.

7. The method of claim 5, further comprising the step of using a microprocessor for controlling an exposure period of said means for sensing light.

8. The method of claim 1, wherein said step of providing a broadband light source comprises providing a tungsten halogen lamp.

9. The method of claim 1, further comprising clipping a noise floor of said spectral signature.

10. The method of claim 1, wherein said step of illuminating at least a portion of said document comprises illuminating only a portion of said document.

11. The method of claim 1, further comprising the step of indexing said document to illuminate a predetermined portion of said document.

12. The method of claim 1, further including the step of employing a document having two surfaces.

13. The method of claim 12, further including the step of illuminating a portion of only one said surface of said document.

14. The method of claim 1, wherein said digitizing step comprises using a microcontroller to digitize said electrical signals.

15. The method of claim 1, wherein said illuminating step further comprises producing reflected light having a wavelength from about 400 to 15,000 nanometers.

16. The method of claim 1, wherein said step of providing a broadband light source comprises providing a light source having a wavelength from about 400 to 15,000 nanometers.

17. The method of claim 1, further comprising providing currency as said document.

18. A method for determining the authenticity of a document comprising:
    providing a broadband light source,
    illuminating at least a portion of said document with said light source to produce reflected light from said document;
    collecting said reflected light;
    converting said reflected light into at least one electrical signal corresponding to said reflected light;
    digitizing said electrical signals of said reflected light;
    producing a spectral signature, and
    wherein said using a matching function step comprises using the equation $$HQI = \sum_{j=0}^{127} |T_i - S_i|$$

to compare said spectral signature, wherein $T_i$ and $S_i$ respectively represent said produced and said stored spectral signatures.

19. A method for determining the authenticity of a document comprising:
    providing a broadband light source;
    illuminating at least a portion of said document with said light source to produce reflected light from said document;
    collecting said reflected light;
    converting said reflected light into at least one electrical signal corresponding to said reflected light;
    digitizing said electrical signals of said reflected light;
    producing a spectral signature; and
    normalizing said spectral signature.

20. A method for determining the authenticity of a document comprising:
    providing a broadband light source;
    illuminating at least a portion of said document with said light source to produce reflected light from said document;
    collecting said reflected light;
    converting said reflected light into at least one electrical signal corresponding to said reflected light;
    digitizing said electrical signals of said reflected light;
    producing a spectral signature; and using the equations $$N_i = \frac{nC_i}{\sum_{j=0}^{127} C_j}$$

to normalize said spectral signature.

21. An apparatus for authenticating a document comprising:
means for providing a broadband light source;
means for illuminating at least a portion of a document with said broadband light source to produce a broadband spectrum of reflected light from said document;
means for collecting said broadband spectrum of reflected light;
means for converting said broadband spectrum of reflected light into at least one electrical signal corresponding to said broadband spectrum of reflected light;
means for generating an intensity value for each of a plurality of different wavelengths of light in the broadband spectrum of reflected light;
means for digitizing said electrical signals of said broadband spectrum of reflected light;
means for producing a spectral signature that includes an array of the intensity values of said document; and
means for comparing said array of intensity values of said spectral signature with an array of reference intensity values of a reference spectral signature to determine an authenticity for said document.

22. The apparatus of claim 21, further comprising means for generating the reference spectral signature by generating an intensity value for each of a plurality of different wavelengths of light reflected from each of a plurality of reference documents of known authenticity and mathematically combining the intensity values for each of the plurality of different wavelengths of light reflected from the reference documents to determine the reference intensity value for each of the plurality of different wavelengths.

23. The apparatus of claim 21, further including means for outputting said authenticity of said document.

24. The apparatus of claim 23, wherein said means for outputting comprises means for activating a first signal for a document determined to be authentic and means for activating a second signal for a document which is determined to be not authentic.

25. The apparatus of claim 21, wherein said means for providing a broadband light source comprises a tungsten halogen lamp.

26. The apparatus of claim 21, further comprising means for indexing said document to illuminate a predetermined portion of said document.

27. The apparatus of claim 21, wherein the wavelength of said reflected light is from about 400 to 15,000 nanometers.

* * * * *

UNITED STATES PATENT AND TRADEMARK OFFICE
CERTIFICATE OF CORRECTION

PATENT NO.    : 6,621,916 B1
DATED         : September 16, 2003
INVENTOR(S)   : James E. Smith et al.

It is certified that error appears in the above-identified patent and that said Letters Patent is hereby corrected as shown below:

Title page,
Item [74], *Attorney* "Bril" should read -- Brij --.

Column 1,
Line 42, "an recognition." should read -- and white recognition. --.

Column 6,
Line 36, "… 127]" should read -- …,127] --.

Column 9,
Line 18, after "percentage" insert -- of the document --.

Column 11,
Table II-continued, last line, omit the ":" after "a".

Column 14,
Line 35, "$j=0$" should read -- $i=0$ --.
Line 41, claim 19 should read -- The method of Claim 1, further comprising normalizing said spectral signature. --

Column 15,
Line 1, "equations" should read -- equation --.

Signed and Sealed this

Ninth Day of March, 2004

JON W. DUDAS
*Acting Director of the United States Patent and Trademark Office*